April 8, 1958 G. W. CLARK 2,829,603
FLUID POWER DEVICE

Filed Feb. 24, 1955 2 Sheets-Sheet 1

George W. Clark
INVENTOR.

BY *Clarence A. O'Brien*
*and Harvey B. Jackson*
Attorneys

April 8, 1958  G. W. CLARK  2,829,603
FLUID POWER DEVICE
Filed Feb. 24, 1955  2 Sheets-Sheet 2
Fig. 4
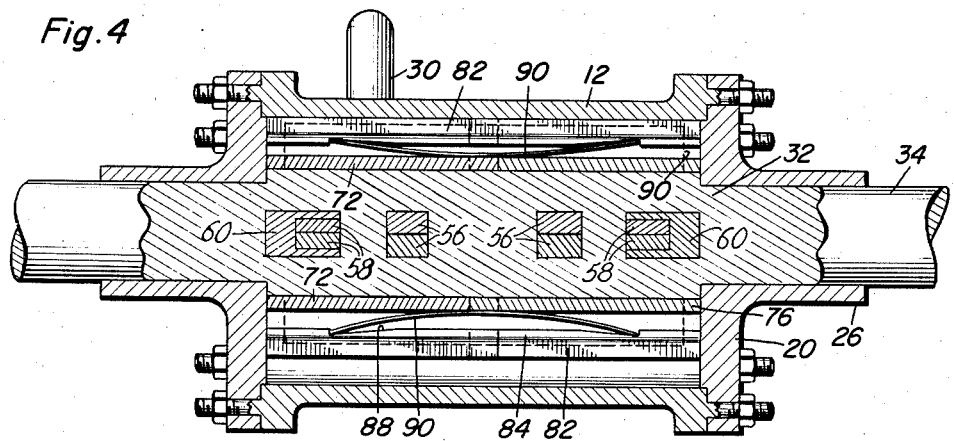
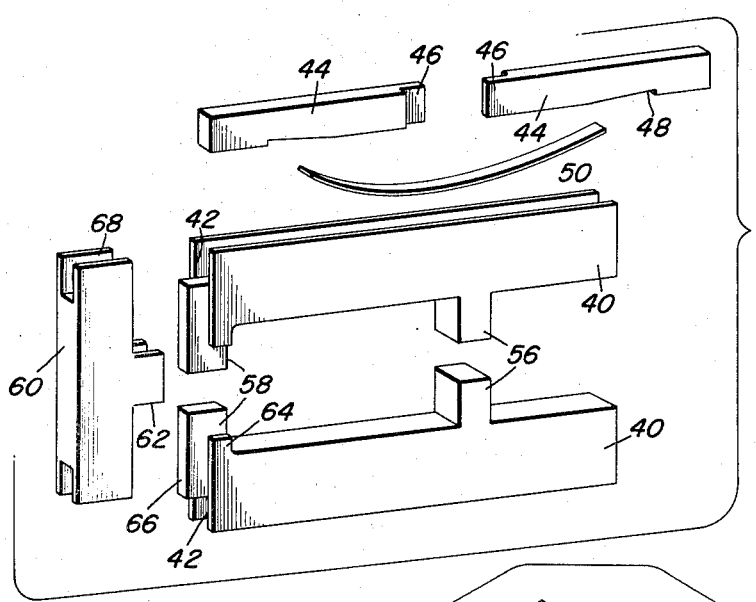
Fig. 5
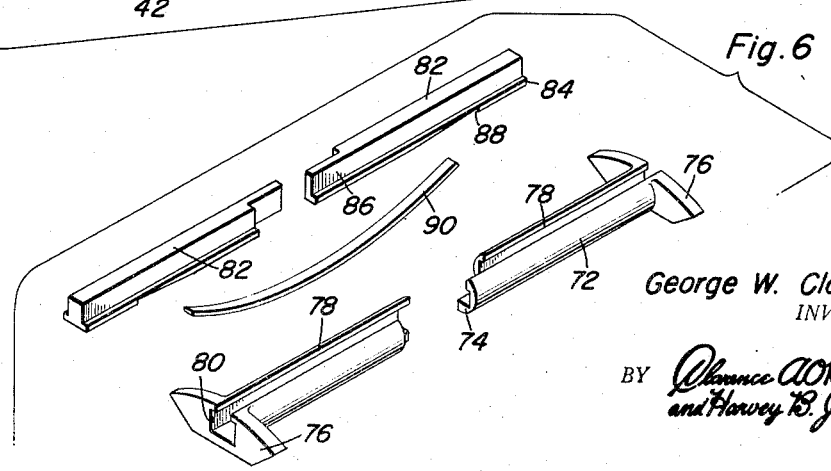
Fig. 6
George W. Clark
INVENTOR.
BY *Clarence A. O'Brien*
*and Harvey B. Jacobson*
Attorneys

United States Patent Office 2,829,603
Patented Apr. 8, 1958

2,829,603

FLUID POWER DEVICE

George W. Clark, Dothan, Ala.

Application February 24, 1955, Serial No. 490,346

7 Claims. (Cl. 103—136)

This invention generally relates to a fluid power device, and more specifically provides improved and novel construction forming a more efficient fluid power device in all of its uses.

An object of the present invention is to provide a fluid power device that may be in the form of a fluid pump or motor that may have various utilities, such as pumping water for irrigation, use as a steam turbine and any other use involving fluid pressures.

Another object of the present invention is to provide improved and novel construction in a fluid power device as set forth above which includes novel structural details for forming an effective and complete seal about the periphery of an eccentrically mounted rotor positioned in a cylindrical housing, as well as the ends of the rotor and the ends of the housing, thereby forming a complete seal between the rotor and housing for more efficient operation.

Other objects of the present invention will reside in its simplicity of construction, efficiency of operation, ease of repair, its adaptation for various uses, and its relatively inexpensive manufacturing and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a longitudinal, vertical sectional view taken substantially upon a plane passing through diametrically opposed longitudinally movable cylindrical members that are positioned between the radially sliding fins;

Figure 5 is a group perspective view showing the assembly of two diametrically opposed fins; and Figure 6 is a group perspective view showing the assembly of a pair of the cylindrical members mounted for longitudinal movement on the rotor together with the sealing bars mounted therein.

Figure 3:
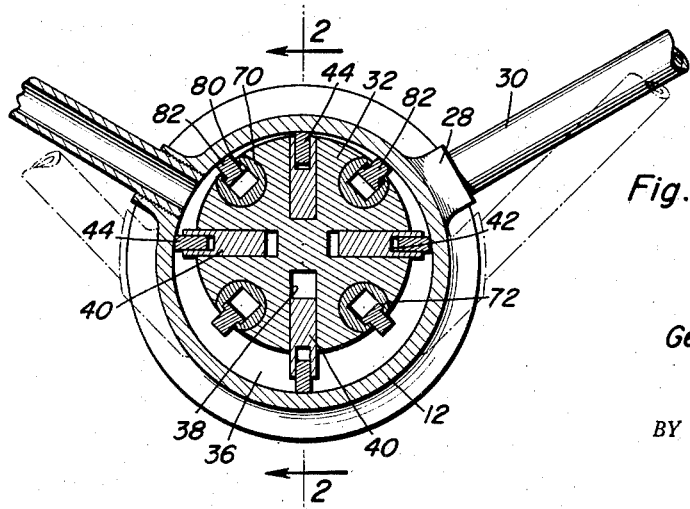
Figure 3 is a transverse, vertical sectional view taken substantially upon a plane passing along section line 3—3 of Figure 1 showing the eccentricity of the rotor together with the positioning of the radially sliding fins and the cylindrical members which form the end seal for the device.

Referring now specifically to the drawings, it will be seen that the numeral 10 generally designates the fluid power device of the present invention which includes a hollow tubular and cylindrical housing 12 having a peripheral and outwardly extending flange 14 at each end with projecting fastening studs 16 thereon for positioning in apertures 18 in end walls 20 and receiving fastening nuts 22 for securely retaining the end walls 20 on the housing 12. The end walls 20 are provided with eccentric bearing apertures 24 that are formed by an outwardly projecting boss 26 at each end of the housing 12. Also, radially projecting bosses 28 are provided at opposite sides of the housing 12 for receiving conduits 30 which are fluid outlet and inlet conduits. As illustrated in Figure 3, the positioning of the bosses 28 and also the conduits 30 is optional, depending upon the particular use to which the fluid device of the present invention may be adapted. It will be understood that the particular arrangement of the inlet and outlet bosses 28 together with the inlet and outlet conduits 30 will be optional and may be arranged in any suitable manner, depending upon the use of the device.

Now referring to Figures 2-6 of the drawings, it will be seen that a cylindrical rotor 32 of generally solid construction is provided with longitudinally extending shaft portions 34 at each end thereof for rotatably journaling the rotor 32 within the housing 12 in an eccentric manner wherein the center of the housing will be spaced below the center of rotation of the rotor 32, thereby providing a working chamber 36 which may be utilized for the expansion of gases or steam or may be utilized in pumping fluids, depending upon the particular adaptation of the device.

The rotor 32 is provided with four equally spaced and radially extending slots 38 each of which slidably receives a radially moving fin 40. Each of the fins 40 is provided on its outer surface with a longitudinal notch 42 for receiving a pair of seal bars 44 therein. Each of the seal bars 44 is provided with a reduced inner end portion 46 for overlapping engagement with the inner end portion 46 of the other bar 44 mounted in the notch 42. The bottom or undersurface of the bars 44 is provided with an inclined recessed portion 48 for receiving the ends of a flat bowed spring 50 that is in engagement with the bottom of the notch 42 with the ends 50 engaging the end walls of the inclined recesses 48, thereby centrally positioning the spring 50 beneath the bars 44 and also centrally positioning the bars 44 in relation to each other, thereby effectively urging the bars 44 into sealing contact with the inner surface of the housing 12, as illustrated in Figure 3 and also in Figure 2.

Figure 1:
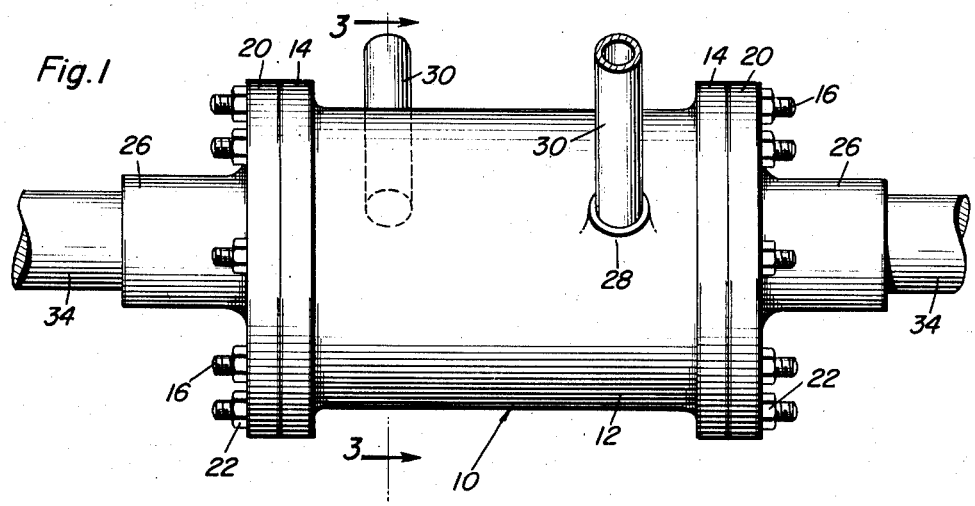
Figure 1 is a side elevational view of the fluid power device of the present invention.
Figure 2:
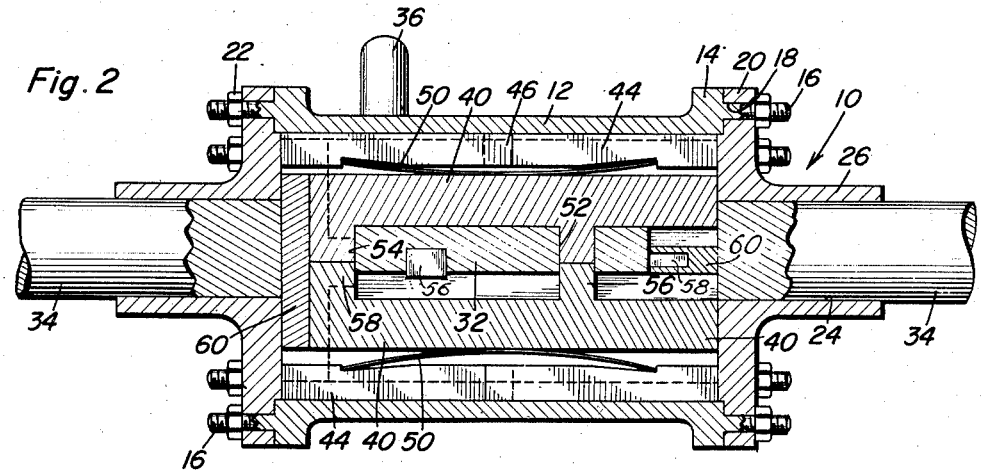
Figure 2 is a longitudinal, vertical sectional view taken substantially upon a plane passing along section line 2—2 of Figure 3 showing the details of construction of the rotor and other internal elements of the invention.

Also, the inwardly extending slots 38 are provided with connecting portions 52 and 54 which receive projections 56 and 58 respectively on the inner edges of the fins 40. These projections 56 and 58 abut each other and the fins 40 thereby forming a substantially complete fin extending diametrically across a diameter of the housing 12 whereby the diametrically opposed fins 40 will move as a single unit and will at all times be retained for contact of bars 44 with opposed surfaces of the housing 12. The projecting portions 58 are disposed at one end of the fins 40 and are interconnected by a connector 60 having projecting lugs 62 received between adjacent projecting lugs 64 on each side of the projecting portions 58. Also, the connector 60 is provided with slots on the inner surface thereof for receiving the outer longitudinal edges 66 of the projections 58. The outer edges of the connector 60 are provided with notches 68 for receiving the ends of the bars 44 disposed in the notches 42. Figure 5 shows one assembly of diametrically opposed fins 40 together with the connector plate 60 and one set of sealing bars 44. It will be understood that another set of sealing bars 44 are disposed in the lower fin 40 in Figure 5, and the members 56 and 58 are in abutment, as illustrated in Figure 2. Also, it will be understood that another set of fins 40 is disposed in right angular relation to the set of fins illustrated in Figure 5, substantially as shown in Figure 3, and these fins are provided with a connector 60 at the opposite end thereof and also, the other set of fins is provided with similar abutment members 56 and 58 wherein the abutment members are substantially equally spaced from end-to-end of the rotor 32, thereby leaving the rotor as a rigid unit and forming fins which act as diametric fins but which may be easily disassembled for repair and replacement.

Referring now specifically to Figures 3, 4 and 6, it will be seen that the rotor 32 is provided with a plurality of equally spaced and diametrically opposed cylindrical grooves 70 which are disposed between the slots 38. The cylindrical grooves 70 are in communication with the external periphery of the rotor 32 and slidably receive a pair of cylindrical members 72 which are provided with reduced semi-cylindrical portions 74 at their inner ends which overlap and are provided with laterally extending and integrally formed plates 76 on their outer ends which are adapted to engage the end walls 20 for forming an effective seal in relation thereto. The cylindrical members 72 are generally hollow and provided with a longitudinal groove 78 in the upper surface thereof and an undercut portion 80 communicating with the grooves 78. Longitudinally slidably mounted within the grooves 78 is a pair of sealing ribs or plates 82 having lateral projecting portions 84 on their bottom edges which are adapted to be slidably positioned within the grooves 78 with the projecting portions 84 positioned in the undercut portion 80 of the grooves 78. The ribs 82 are each provided with a reduced inner end portion 86 for overlapping for forming a continuous and adjustable rib, and the bottom surface thereof is provided with an inclined recess 88 for receiving the ends of a bowed flat spring 90. The spring 90 is positioned between the bottom of the grooves 78 and the undersurface of the ribs 82 and the ends thereof engage the recesses 88, thereby positioning the cylindrical members 72, ribs 82 and the center of the spring in position, and the action of the spring 90 engaging the joint between the members 72 will cause the cylindrical members 72 to be urged longitudinally outwardly due to inward pressure on this point which tends to spread the members 72 apart and also cause the ribs 82 to be moved radially and longitudinally outwardly. As illustrated in Figure 4, the rotor 32 is provided with recessed portions 90 in each end thereof for receiving the laterally extending sealing plates 76. Also, it will be noted that the sealing ribs 82 do not contact the inner surface of the housing 12 during the entire rotation of the rotor 32, but only contact the housing 12 as the ribs 82 move towards the portion of the housing 12 adjacent the rotor 32, due to the eccentricity of the rotor 32. These sealing ribs 82 form an auxiliary seal when the fluid is under high pressure, due to the contraction of the working chamber 36, depending upon the particular adaptation of the present invention.

In practical operation, the sealing bars 44 form a sealing contact with the inner periphery of the housing 12 at all positions of the rotor 32 and the sealing ribs 82 form an auxiliary seal during the portion of the rotation of the rotor 32 when said sealing ribs 82 are adjacent the housing 12. The end plates 76 sliding engage the inner surface of the end walls 20, thereby forming an effective seal for the end walls of the rotor, thereby preventing escape of pressurized fluids past the ends of the rotor 32, thereby forming a more efficient fluid power device. Also, the plates 76 on the cylindrical member 72 prevent leakage of pressurized fluid between the ends of the rotor 32 and the end plates 20, thereby substantially eliminating possible leakage of the pressurized fluid past the bearing surface journaling the shaft portions 34, such as the bearing bosses 26, as illustrated. Therefore, it will readily be apparent that the power device of the present invention is more efficient due to the elimination of compression leakage past the various points where such leakage usually occurs.

While one form of the invention has been illustrated, it will be understood that the principles of the invention may be utilized in various types of installations wherein it may be utilized as a driven pump or as a driving motor, and it will also be noted that all elements of the invention are removable and replaceable for permitting easy repair of the device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A fluid power device comprising a hollow cylindrical housing, removable end walls on said housing with eccentrically positioned bearing openings therein, a rotor eccentrically mounted in said housing with longitudinally projecting shaft portions rotatably journaled in said bearing openings in the end walls, fluid inlet and outlet conduits communicating with said housing, said rotor being cylindrical with a plurality of slots in the peripheral surface thereof, a projecting fin radially movably mounted in each of said slots, means on the outer edge of each fin in sliding contact with the inner surface of said housing during rotation of the eccentric rotor, and means on said rotor slidingly contacting the end walls of said housing thereby forming an effective fluid seal, said rotor having a plurality of circumferentially spaced cylindrical grooves in the periphery thereof, a pair of cylindrical members having reduced overlapping ends mounted in said grooves, each of said cylindrical members having a laterally extending plate on the outer end thereof and constituting the means on the rotor for contact with the end walls of said housing, each of said cylindrical members having a longitudinal groove in the outer surface thereof, a pair of sealing ribs having overlapping inner ends mounted in said groove, a bowed flat spring disposed between said ribs and the bottom of said grooves for urging the ribs radially outwardly.

2. A fluid power device comprising a hollow cylindrical housing, removable end walls on said housing with eccentrically positioned bearing openings therein, a rotor eccentrically mounted in said housing with longitudinally projecting shaft portions rotatably journaled in said bearing openings in the end walls, fluid inlet and outlet conduits communicating with said housing, said rotor being cylindrical with a plurality of slots in the peripheral surface thereof, a projecting fin radially movably mounted in each of said slots, means on the outer edge of each fin in sliding contact with the inner surface of said housing during rotation of the eccentric rotor, and means on said rotor slidingly contacting the end walls of said housing thereby forming an effective fluid seal, said rotor having a plurality of circumferentially spaced cylindrical grooves in the periphery thereof, a pair of cylindrical members having reduced overlapping ends mounted in said grooves, each of said cylindrical members having a laterally extending plate on the outer end thereof and constituting the means on the rotor for contact with the end walls of said housing, each of said cylindrical members having a longitudinal groove in the outer surface thereof, a pair of sealing ribs having overlapping inner ends mounted in said groove, a bowed flat spring disposed between said ribs and the bottom of said grooves for urging the ribs radially outwardly, said cylindrical grooves engaging greater than one-half of the peripheral surface of said cylindrical members thereby retaining said cylindrical members within said grooves, said grooves in the cylindrical members being undercut, said sealing ribs having projecting bottom longitudinal edges engaging the undercut in said grooves for retaining the ribs in said grooves, said ribs having recesses in the bottom thereof for receiving the ends of said spring thereby centrally positioning the spring with the bowed portion engaging the overlapped ends of the cylindrical members.

3. The combination of claim 2 and wherein said rotor is provided with end recesses for receiving said plates on the ends of said cylindrical members, each of said ribs in the cylindrical members being in contact with the housing during only a portion of each revolution of the eccentric rotor.

4. A fluid power device comprising a hollow cylindrical housing, removable end walls on said housing with eccentrically positioned bearing openings therein, a rotor eccentrically mounted in said housing with longitudinally projecting shaft portions rotatably journaled in said bearing openings in the end walls, fluid inlet and outlet conduits communicating with said housing, said rotor being cylindrical with a plurality of slots in the peripheral surface thereof, a projecting fin radially movably mounted in each of said slots, means on the outer edge of each fin in sliding contact with the inner surface of said housing during rotation of the eccentric rotor, and means on said rotor slidingly contacting the end walls of said housing thereby forming an effective fluid seal, each of said fins having a notch in the outer edge thereof, said means on the outer edge of each fin including a pair of sealing contact bars with overlapping inner ends mounted in each of said notches, and a bowed flat spring member disposed between said bars and the bottom of the notch for urging the bars in sealing contact with the surface of the housing, said bars having recesses on the undersurface thereof for receiving the ends of the spring thereby centrally positioning the spring between the bars and the bottom of the notch, said rotor having a plurality of circumferentially spaced cylindrical grooves in the periphery thereof, a pair of cylindrical members having reduced overlapping ends longitudinally slidably mounted in said grooves, each of said cylindrical members having a laterally extending plate on the outer end thereof and constituting the means on the rotor for contact with the end walls of said housing, each of said cylindrical members having a longitudinal groove in the outer surface thereof, a pair of sealing ribs having overlapping inner ends mounted in said groove, a bowed flat spring disposed between said ribs and the bottom of said grooves for urging the ribs radially outwardly.

5. A fluid power device comprising a hollow cylindrical housing, removable end walls on said housing with eccentrically positioned bearing openings therein, a rotor eccentrically mounted in said housing with longitudinally projecting shaft portions rotatably journaled in said bearing openings in the end walls, fluid inlet and outlet conduits communicating with said housing, said rotor being cylindrical with a plurality of slots in the peripheral surface thereof, a projecting fin radially movably mounted in each of said slots, means on the outer edge of each fin in sliding contact with the inner surface of said housing during rotation of the eccentric rotor, and means on said rotor slidingly contacting the end walls of said housing thereby forming an effective fluid seal, each of said fins having a notch in the outer edge thereof, said means on the outer edge of each fin including a pair of sealing contact bars with overlapping inner ends mounted in each of said notches, and a bowed flat spring member disposed between said bars and the bottom of the notch for urging the bars in sealing contact with the surface of the housing, said bars having recesses on the undersurface thereof for receiving the ends of the spring thereby centrally positioning the spring between the bars and the bottom of the notch, said rotor having a plurality of circumferentially spaced cylindrical grooves in the periphery thereof, a pair of cylindrical members having reduced overlapping ends longitudinally slidably mounted in said grooves, each of said cylindrical members having a laterally extending plate on the outer end thereof and constituting the means on the rotor for contact with the end walls of said housing, each of said cylindrical members having a longitudinal groove in the outer surface thereof, a pair of sealing ribs having overlapping inner ends mounted in said groove, a bowed flat spring disposed between said ribs and the bottom of said grooves for urging the ribs radially outwardly, said cylindrical grooves engaging greater than one-half of the peripheral surface of said cylindrical members thereby retaining said cylindrical members within said grooves, said grooves in the cylindrical members being undercut, said sealing ribs having projecting bottom longitudinal edges engaging the undercut in said grooves for retaining the ribs in said grooves, said ribs having recesses in the bottom thereof for receiving the ends of said spring thereby centrally positioning the spring with the bowed portion engaging the overlapped ends of the cylindrical members.

6. A fluid power device comprising a hollow cylindrical housing, removable end walls on said housing with eccentrically positioned bearing openings therein, a rotor eccentrically mounted in said housing with longitudinally projecting shaft portions rotatably journaled in said bearing openings in the end walls, fluid inlet and outlet conduits communicating with said housing, said rotor being cylindrical with a plurality of slots in the peripheral surface thereof, a projecting fin radially movably mounted in each of said slots, means on the outer edge of each fin in sliding contact with the inner surface of said housing during rotation of the eccentric rotor, and means on said rotor slidingly contacting the end walls of said housing thereby forming an effective fluid seal, each of said fins having a notch in the outer edge thereof, said means on the outer edge of each fin including a pair of sealing contact bars with overlapping inner ends mounted in each of said notches, and a bowed flat spring member disposed between said bars and the bottom of the notch for urging the bars in sealing contact with the surface of the housing, said bars having recesses on the undersurface thereof for receiving the ends of the spring thereby centrally positioning the spring between the bars and the bottom of the notch, said rotor having a plurality of circumferentially spaced cylindrical grooves in the periphery thereof, a pair of cylindrical members having reduced overlapping ends longitudinally slidably mounted in said grooves, each of said cylindrical members having a laterally extending plate on the outer end thereof and constituting the means on the rotor for contact with the end walls of said housing, each of said cylindrical members having a longitudinal groove in the outer surface thereof, a pair of sealing ribs having overlapping inner ends mounted in said groove, a bowed flat spring disposed between said ribs and the bottom of said grooves for urging the ribs radially outwardly, said cylindrical grooves engaging greater than one-half of the peripheral surface of said cylindrical members thereby retaining said cylindrical members within said grooves, said grooves in the cylindrical members being undercut, said sealing ribs having projecting bottom longitudinal edges engaging the undercut in said grooves for retaining the ribs in said grooves, said ribs having recesses in the bottom thereof for receiving the ends of said spring thereby centrally positioning the spring with the bowed portion engaging the overlapped ends of the cylindrical members said rotor being provided with end recesses for receiving said plates on the ends of said cylindrical members, each of said ribs in the cylindrical members being in contact with the housing during only a portion of each revolution of the eccentric rotor.

7. A fluid power device comprising a hollow closed housing having a cylindrical inner surface, a rotor eccentrically mounted in said housing for rotation, said rotor having shafts extending through the ends of the housing and rotatably journaled therein, fluid inlet and outlet conduits communicated with the interior of the housing, said rotor having diametrically opposed slots interconnected by openings in the bottoms thereof, radially disposed fins slidably mounted in said slots, said fins including inwardly extending projections in said openings with the projections being in abutting engagement with each pair of fins extending substantially diametrically across the interior of the housing, spring urged means movably mounted on the outer edge of each fin for continuous sealing engagement with the inner peripheral surface of the housing, said rotor having notches in the peripheral surface thereof, and movable means mounted in said notches and projecting radially outwardly for contact with the inner surface of the housing during only a portion of a revolution of the rotor.

References Cited in the file of this patent

UNITED STATES PATENTS

| | | |
|---|---|---|
| 353,199 | Brewer | Nov. 23, 1886 |
| 732,671 | Andrews | June 30, 1903 |
| 899,027 | Burton | Sept. 22, 1908 |
| 1,452,024 | Campbell | Apr. 17, 1923 |

FOREIGN PATENTS

| | | |
|---|---|---|
| 11,435 | Great Britain | July 16, 1908 |
| 789,091 | France | Aug. 12, 1935 |